United States Patent [19]

Mayer

[11] Patent Number: 4,568,045

[45] Date of Patent: Feb. 4, 1986

[54] DOOR OPERATED LINKAGE FOR SUPPORT OF RETRACTED AIRPLANE LANDING GEAR

[75] Inventor: John D. Mayer, Bellevue, Wash.

[73] Assignee: The Boeing Company, Seattle, Wash.

[21] Appl. No.: 524,177

[22] Filed: Aug. 17, 1983

[51] Int. Cl.<sup>4</sup> ............................................. B64C 25/26
[52] U.S. Cl. ................................................ 244/102 R
[58] Field of Search .......... 244/100 R, 102 SL, 102 R, 244/129.6, 129.5

[56] References Cited

U.S. PATENT DOCUMENTS

| | | | |
|---|---|---|---|
| 2,431,093 | 11/1947 | Trich | 244/102 |
| 2,432,408 | 12/1947 | Glasgow et al. | 244/102 |
| 2,452,251 | 10/1948 | Martin | 244/102 |
| 2,475,723 | 7/1949 | Sanford | 244/102 SL |
| 2,484,900 | 10/1949 | McPherson et al. | 244/102 |
| 2,487,548 | 11/1949 | Hawkins, Jr. | 244/102 |
| 2,529,401 | 11/1950 | Lawson | 244/102 SL |
| 2,538,878 | 1/1951 | Misulis | 244/102 |
| 2,552,843 | 5/1951 | Clifton et al. | 244/102 |
| 2,661,171 | 12/1953 | Allen | 244/102 |
| 2,750,134 | 6/1956 | Hawkins, Jr. et al. | 244/102 |
| 2,752,112 | 6/1956 | Payne, Jr. | 244/102 |
| 2,772,060 | 11/1956 | Bendicsen | 244/102 |

FOREIGN PATENT DOCUMENTS 0031602  7/1981  European Pat. Off. ...... 244/102 SL

*Primary Examiner*—Galen L. Barefoot
*Attorney, Agent, or Firm*—Morris A. Case; Bernard A. Donahue

[57] ABSTRACT

A shaped support beam is joined to and extends laterally across a landing gear door to provide support and to hold a retracted airplane landing gear in position when the landing gear door is closed. Pivotable linkage, extending between airplane structure and the shaped support beam, press against the landing gear to hold the gear in the retracted position with the door latched, and to be pressed against to move an unlatched door aside to permit extension of the landing gear into operating position.

7 Claims, 7 Drawing Figures

DOOR OPERATED LINKAGE FOR SUPPORT OF RETRACTED AIRPLANE LANDING GEAR

BACKGROUND OF THE INVENTION

On large airplanes with retractable landing gear, it is often necessary to have the landing gear doors actuated separately from the gear retraction actuation. This makes it necessary to sequence the operation of the gear and doors, and to have means of latching the door closed, and supporting the gear in the retracted position such that the position will be maintained when hydraulic power is removed either intentionally or inadvertently. It is known to use a separate latch for the landing gear as well as a separate latch for the landing gear door. It is also known to have the retracted landing gear supported by the landing gear door with only a latch for the door required. The known single latch methods use a pressure point, stationery with respect to the door, to contact the landing gear and hold it in place when the door is closed. This can present a problem in the situation, as is often the case, where the axis of rotation of the landing gear and the axis of rotation of the landing gear door are not parallel to each other. The problem shows up when the retracted gear must be extended when hydraulic power is absent. The problem being that when the door is unlatched the weight of the landing gear presses against the door, the gear and door are both moving at the same time, and the gear may catch on parts of the door. It was found a linkage system will not only do a very good job but will solve this problem.

SUMMARY OF THE INVENTION

A retracted airplane landing gear is secured in place by the closing of the landing gear door. The door has a transversely extending reinforcing beam that acts to support the retracted landing gear. A combined pivotable linkage extends between airplane structure and the support beam, and presses upward on a support shoe attached to the landing gear to lock the retracted gear in place when the door is closed and latched. When the landing gear door is unlatched the weight of the landing gear acts through the support shoe and the pivotable linkage to open and move aside the door to allow the landing gear to move into operating position.

DESCRIPTION OF THE DRAWINGS

FIG. 5 is a fragmented blown up perspective view taken on line 1—1 of FIG. 3.

DETAILED DESCRIPTION

Figure 1:
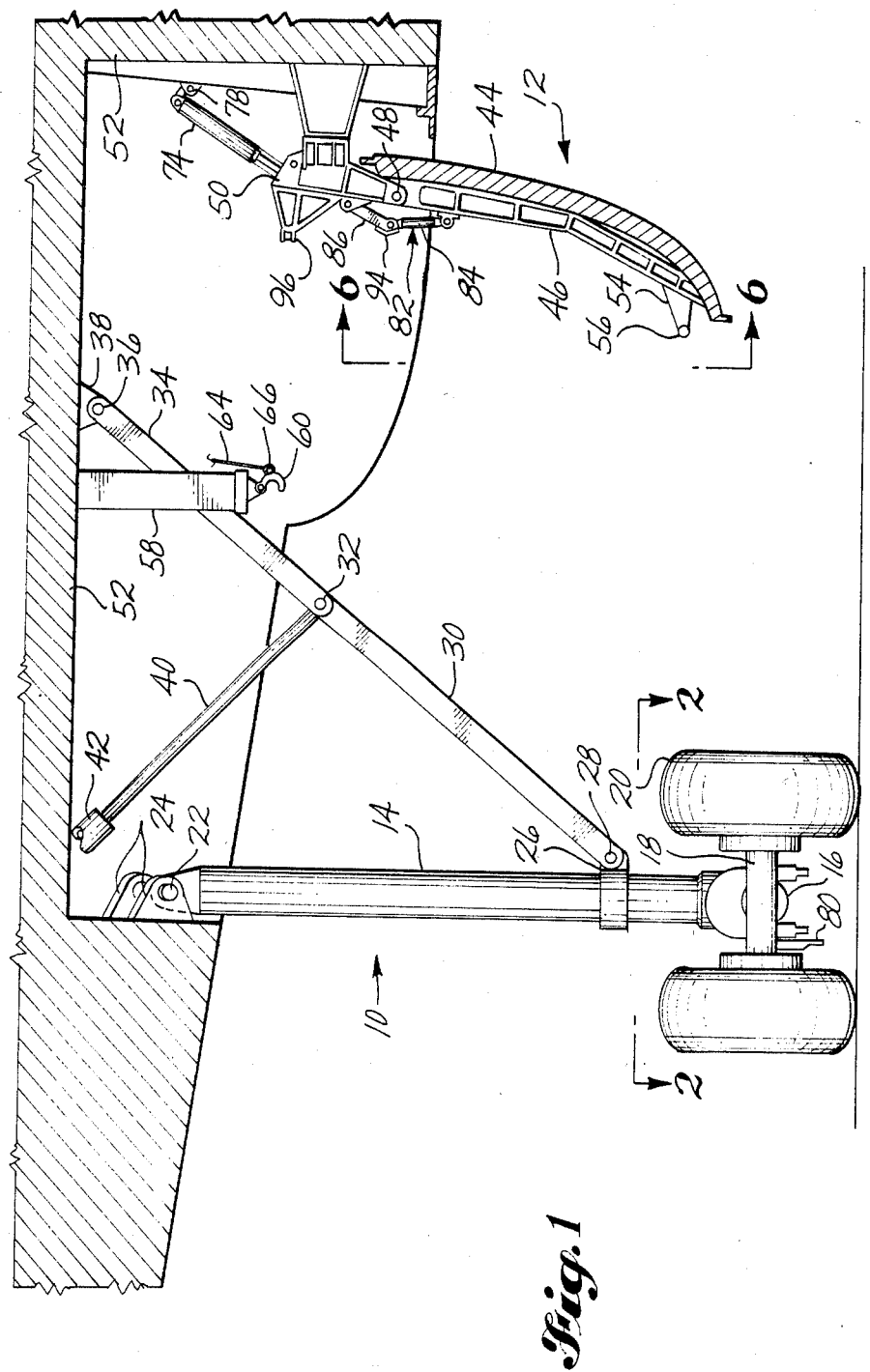
FIG. 1 shows a fragmented front end view of an airplane with a landing gear extended and a landing gear door open.
Figure 2:
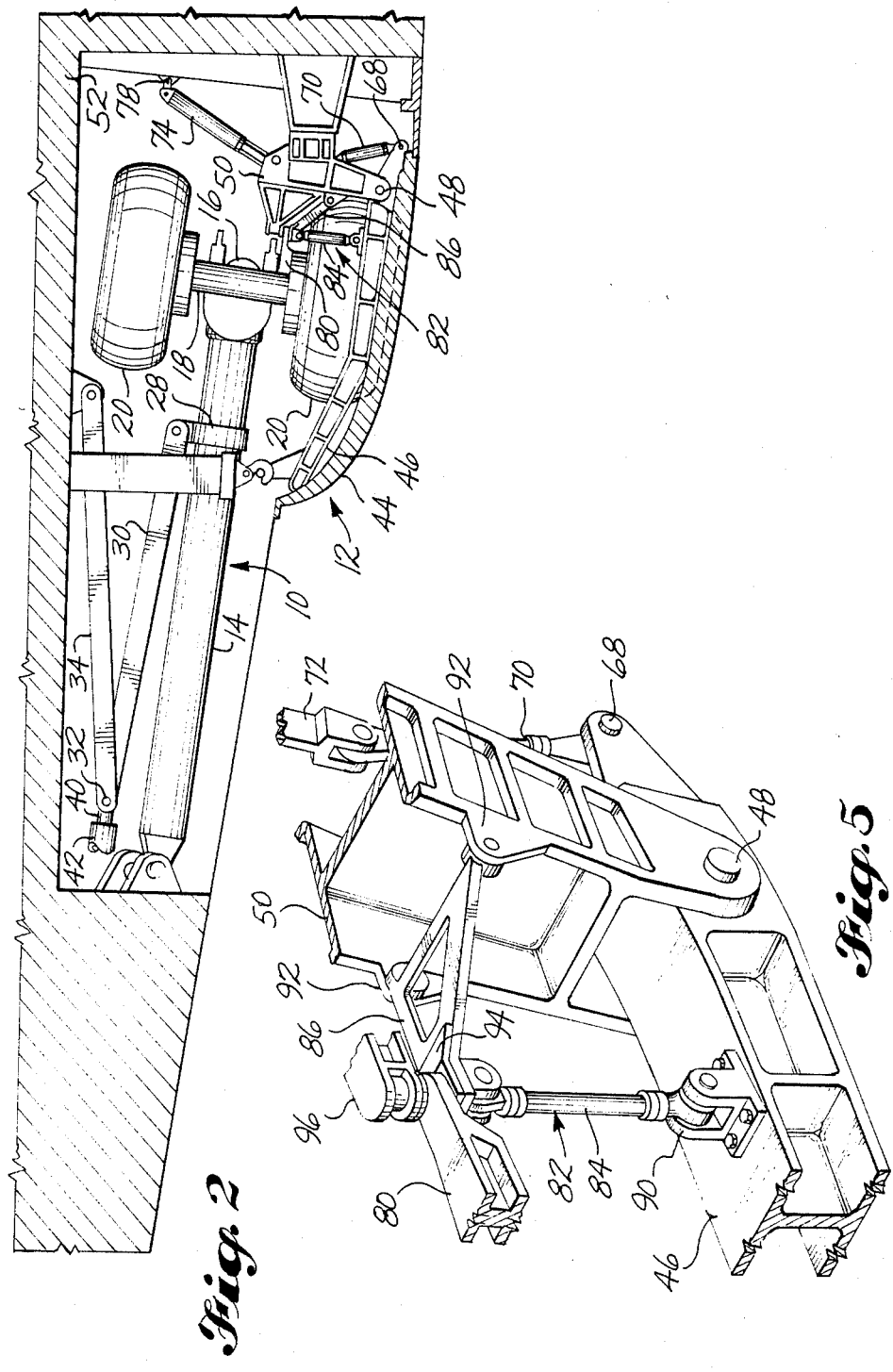
FIG. 2 shows the same view with the landing gear retracted, and the landing gear door closed.

An airplane landing gear 10, and a landing gear door 12, work in combination, and are sequenced with respect to each other. In FIG. 1, the landing gear is shown in the extended or operating position. That landing gear has a shock strut 14, truck beam 16, axle 18 and four tires 20. It is shown with a simplified actuation system with trunnion 22, pivotally joined to support 24. A clamp 26, supports pin 28, for pivotally joining to linkage 30. The linkage is pivotally joined by pin 32, to a second pivotable linkage 34, the other end of which is pivotally joined by pin 36 to airplane structure 38, and to rod 40; which is actuated by hydraulic cylinder 42. The cylinder is pivotally mounted, not shown, and is actuated by hydraulic power not shown. The landing gear is moved between operating position and retracted position by this actuation system.

Figure 3:
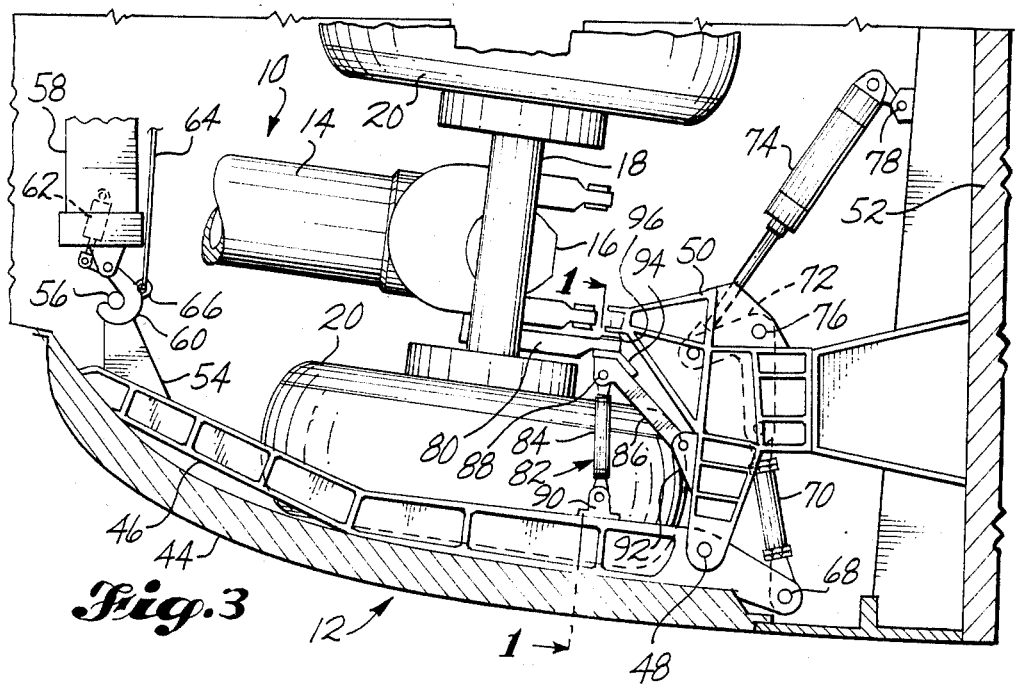
FIG. 3 shows a blown up fragmented view of part of FIG. 2.
Figure 4:
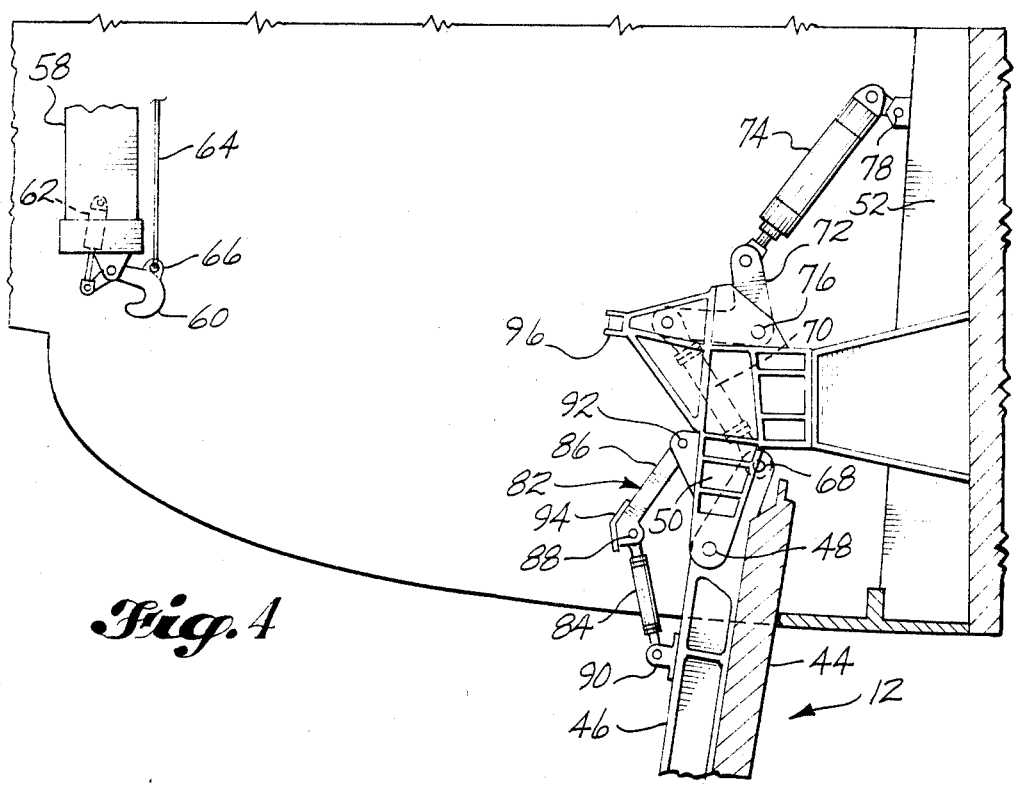
FIG. 4 shows the same view as in FIG. 3, but with the landing gear removed and the door open.
Figure 6:
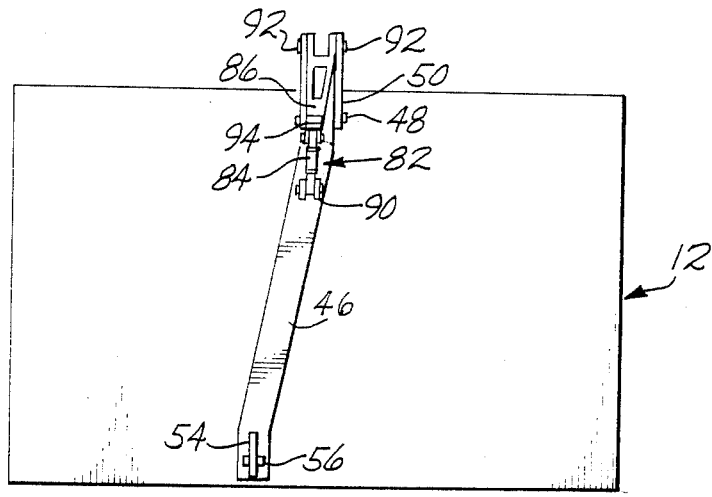
FIG. 6 is a view taken along line 6—6 of FIG. 1.
Figure 7:
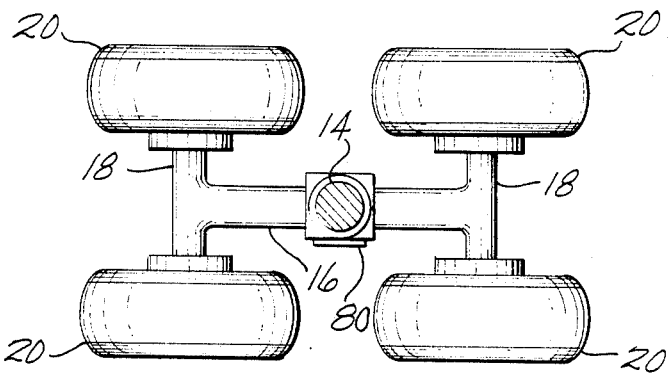
FIG. 7 is a view taken along line 2—2 of FIG. 1.

The landing gear door 12, has a formed outer surface 44, and is joined along the inside to a support beam 46. This support beam is shaped to conform to the door, it extends transversely across the door. This beam extends straight across in the situation where the axis of rotation of the landing gear and the axis of rotation of the landing gear door are parallel to each other. In the situation where these axes of rotation extend at an angle with respect to each other, the beam is shaped as it extends across, as is best shown in FIG. 6, to provide clearance with respect to the landing gear. The support beam is pivotally mounted at 48, to a beam 50, which in turn is joined to airplane structure 52. At the other end of the support beam there is an inwardly extending member 54, which holds a pin 56, to permit latching the beam with door in the closed position. To accomplish the latching there is a supporting structure 58, that attaches to the airplane structure 52, and provides for a catch 60, for latching to the pin 56, and securing the door in the closed position. That catch is moved between the closed and open position by actuation of hydraulic cylinder 62, see FIGS. 3 and 4. This catch may also be released by hand or by electrical actuation, when the hydraulic power is off by pulling on line 64, which connects to ring 66 on the catch.

The door is moved between open and closed position by an actuation system that is pivotally connected by pin, 68 to the support beam. The actuating system is made up of linkage 70, which in turn is pivotally connected to lever arm 72 which in turn is pivotally acted upon by hydraulic cylinder 74. The lever arm is pivotally joined at 76 to beam 50 and the hydraulic cylinder is pivotally joined at 78 to airplane structure 52.

The landing gear has a support shoe 80 secured adjacent the end of the shock strut 14. This support shoe is located to be contacted by cooperating linkage 82, to press against and to hold the landing gear 10, in the retracted position when the landing gear door 12 is closed and locked. The cooperating linkage has two bars or linkages 84 and 86 that are pivotally joined together at one end at 88. The other end of bar 84 is pivotally joined to a yoke shaped holder 90, which in turn is joined to the support beam 46. The other end of linkage 86, is pivotally joined to a pair of support members 92, which in turn are joined to beam 50. A wear plate 94, is located on linkage 88, at the juncture between linkage 84 and 86. This wear plate is formed and located to provide a wear surface that is contacted by support shoe 80.

In operation the landing gear 10, would be down and locked in position, and the landing gear door 12, would be closed for take off. Upon becoming airborne the landing gear door will be opened, the landing gear brought up into the retracted position, and the landing gear door closed and locked in place. Near the end of the closing of the door, the linkage 82, brings the wear plate 94, up against the underside of support shoe 80 on the landing gear to hold the gear in place. When in this position the support shoe also contacts stop 96, which is attached to beam 50. This stop is located to limit upward movement of the landing gear when in the retracted position. Normally the door would be actuated, and then the landing gear would be lowered by use of the control systems for those units. Should the hydraulic power be shut off for any reason the landing gear is lowered into position by pulling on line 64, to release the catch holding the door latched. The support shoe 80, on the landing gear then presses the weight of the gear against wear plate 94, to push the door open to permit the landing gear to drop into and lock in operating position. By the time the support shoe leaves the wear plate the door has been removed out of any contact with the gear.

I claim:

1. An apparatus for interaction between an airplane landing gear and a landing gear door comprising: a support beam joined to and transversely extending along an airplane landing gear door, means for pivotally rotating the beam with door between door open and door closed and locked position, a support shoe mounted adjacent and end of the landing gear shock strut, a pair of bars pivotally mounted together at one end and having an opposite end of one bar pivotally mounted to airplane structure and an opposite end of the other bar pivotally mounted to the beam, and a wear plate mounted to the joined end of the two pivotable bars to contact the support shoe to lock the retracted landing gear in position when the landing gear door is closed.

2. An apparatus as in claim 1 further comprising: the wear plate shaped to extend along the upper surface of the bar that joins to airplane structure to be pressed against by the support shoe to move the door aside and permit the landing gear to move to the operating position when the door is unlatched and the gear and door power actuators are off.

3. An apparatus as in claim 2 further comprising a stop located to be contacted by the support shoe to limit upward movement of the landing gear when in the retracted position.

4. An apparatus as in claim 2 further comprising the landing gear having a different angle of axis of rotation from an axis of rotation of the landing gear door, and the support beam having shaped lines as it extends across the door.

5. An apparatus for controlling airplane landing gear and landing gear door interaction, with the apparatus comprising: an airplane landing gear door having a transverse support beam pivotally joined adjacent one end to airplane structure and means for latching to airplane structure adjacent the other end, a support shoe attached near the end of a shock strut of an airplane landing gear and located to be contacted and pressed upward when the landing gear is in a retracted position, cooperating pivotable linkage between airplane structure and support beam with the linkage located to press joined ends against the support shoe to lock the landing gear in place when the landing gear door is closed with the landing gear retracted.

6. An apparatus for controlling airplane landing gear and landing gear door interaction as in claim 5 wherein the support beam extends transversely along a shaped line.

7. A method of interacting between an airplane landing gear and an landing gear door for controlling stowage and release of the landing gear, with steps comprising: securing a support shoe to the landing gear, extending a reinforcing beam across a landing gear door, providing for door pivoting from airplane structure at one end of the beam and for latching to airplane structure at the other end of the beam, securing pivotable linkage between the airplane support structure and the reinforcing beam, and locating the linkage for pressing against the support shoe and holding the gear in the retracted position upon closing the door, and for being pressed against by the support shoe and for moving the door aside to open when the door is unlatched.

* * * * *